(12) United States Patent
Le

(10) Patent No.: US 6,550,180 B1
(45) Date of Patent: *Apr. 22, 2003

(54) SPRING DOOR CRAB POT

(76) Inventor: Tam Kien Le, 5423 S. Stevens St., Tacoma, WA (US) 98409

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 650 days.

(21) Appl. No.: 08/995,431

(22) Filed: Dec. 20, 1997

(51) Int. Cl.[7] ............................................. A01K 69/00
(52) U.S. Cl. ........................................ 43/100; 43/105
(58) Field of Search ...................... 43/100, 102, 103, 43/104, 105

(56) References Cited

U.S. PATENT DOCUMENTS

| | | | | |
|---|---|---|---|---|
| 2,196,928 A | * | 4/1940 | Lile | 43/100 |
| D247,677 S | | 4/1978 | Bockhorn | 43/100 |
| D303,135 S | | 8/1989 | Simonson | 43/105 |
| 4,864,770 A | * | 9/1989 | Serio | 43/100 |
| 4,905,405 A | | 3/1990 | Hendricks | 43/100 |
| 5,088,230 A | | 2/1992 | Moritz | 43/100 |
| 5,131,184 A | * | 7/1992 | Harrison | 43/100 |
| 5,133,149 A | * | 7/1992 | Smyly | 43/100 |
| 5,168,653 A | | 12/1992 | Wyman et al. | 43/100 |
| 5,259,809 A | * | 11/1993 | Rainey, Jr. | 43/100 |
| 5,287,647 A | | 2/1994 | Longo | 43/100 |
| 5,353,541 A | * | 10/1994 | Jonason | 43/105 |
| 5,478,273 A | | 12/1995 | Ives | 43/100 |

* cited by examiner

*Primary Examiner*—Kurt Rowan
(74) *Attorney, Agent, or Firm*—Delbert J. Barnard; Joan H. Pauly

(57) ABSTRACT

A round crab pot provides crabs easy access from all directions, while strongly discouraging exit except by crabs of nonallowable small size. The pot may be of variable weight and size for commercial or individual use. The pot frame has an interchangeable top and bottom kept parallel by perpendicular supporting posts. The pot entrance occupies the entire height and circumference. The entrance is formed by a plurality of elongated spring steel rods connected to the top and/or bottom of the frame. The rods are positioned to slant inwardly toward the center of the pot and are connected by spring steel wire and a thin plastic medium. Thus, the entrance exhibits a spring-like tension as crabs enter. In a first variation, the rods are connected to only one end of the frame. Crabs may enter at ground level with the rods extending from the top of the pot, slanting inward and downward toward the center. By reversing the top and bottom, crabs may enter by walking up the rods. Rods of a lesser length may be attached to both the top and bottom of the pot. Crabs walk up the rods to the midpoint of the height of the pot and drop into the center. In both variations, the rods will not allow the crabs to exit.

12 Claims, 2 Drawing Sheets

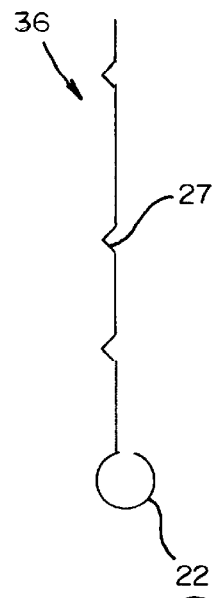
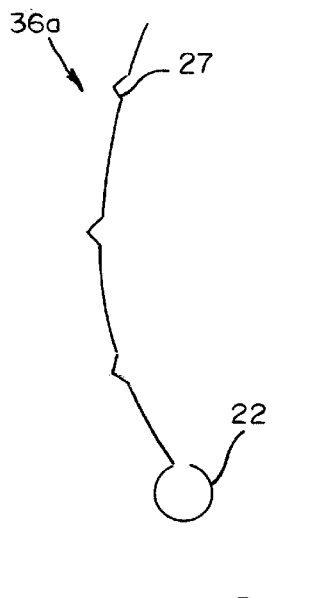
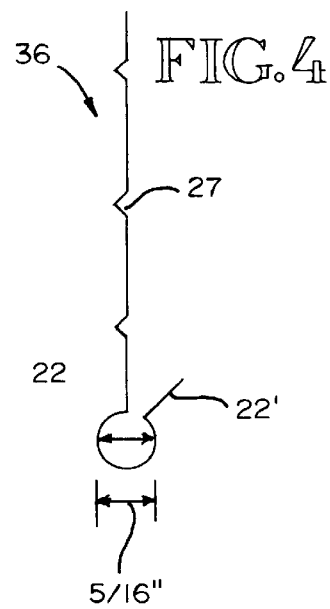
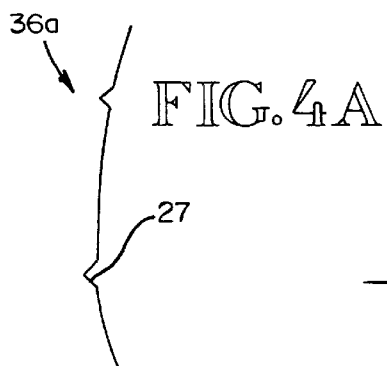
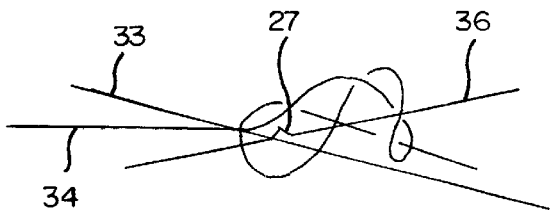
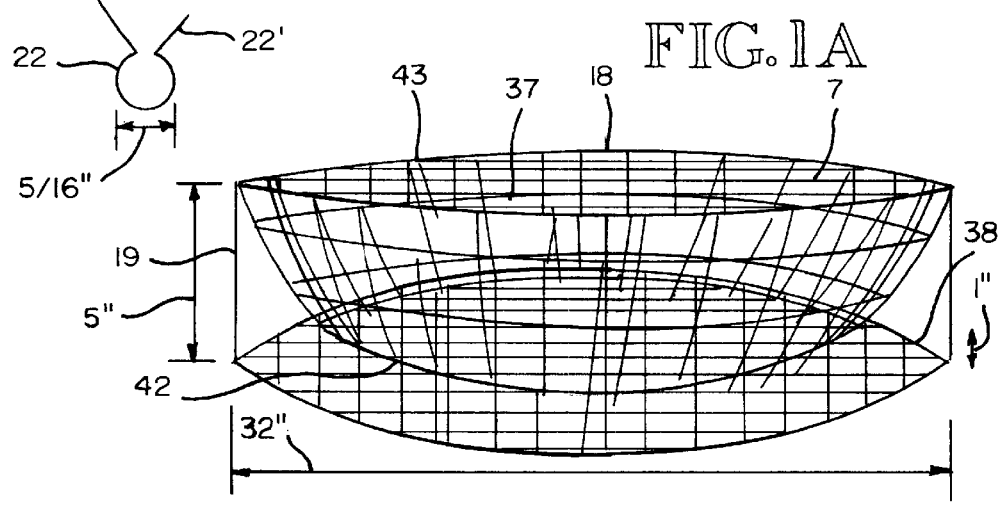

SPRING DOOR CRAB POT

TECHNICAL FIELD

This invention relates to crab traps and crab pots used to entrap crabs for both commercial and individual use. More specifically, it relates to a crab pot with a spring door to permit entry but discourage exit.

BACKGROUND INFORMATION

Crab pots, also referred to as crustacean traps, and crab traps have been used for entrapping crabs for many years. Commercially, crab pots are secured to buoys and dropped to the ocean floor. Individuals may incorporate a method of dropping pots off of docks. Usually this method is done through the use of a trap comprising one or two rings with attached net and ropes for dropping and pulling up. Another trap consists of a collapsible wire frame. These traps remain in a flat position and thus allow crabs to enter and escape freely, making it necessary for the individual to pull the pot up at frequent intervals.

Commercial crab pots have been invented and patented in the United States as early as U.S. Pat. No. 679,327 to Newcorn (1901). Other early forms of the art are U.S. Pat. No. 1,531,300 to Merle, Sr. (1925); U.S. Pat. No. 1,968,758 to Gatch (1934); U.S. Pat. No. 2,584,643 to Clute (1952); and U.S. Pat. 2,918,749 to Portner (1959).

Since this time crab pots have remained similar in appearance with some changes to entrance gates. Two inventions that exhibit an alternative to the appearance have been U.S. Pat. No. 4,271,625 to Archer (1981), and U.S. Pat. No. 5,640,800 to Peterson (1997), both incorporating a tubular member and the use of nooses. Other inventions, which appear to have been directed specifically to the individual's use, are U.S. Pat. No. Des. 303,135 to Simonson (1989), and U.S. Pat. No. 5,287,647 to Longo (1994). The previous two examples reflect the problem of requiring the individual to pull up the pot at brief intervals, since the crabs may enter and exit freely, until the pot is pulled up out of the water. U.S. Pat. No. 4,905,405 to Hendricks (1990), is an example of a crab pot having a more complicated entrance gate with moveable parts. U.S. Pat. No. 5,478,273 to Ives (1995) also exhibits an entrance gate with moveable parts and a trigger mechanism. These features add to the possibility of problems in maintaining the proper function of the entrance.

Inventors have created several types of crab pots, but they have one or more of the following disadvantages:

(a) crabs can reach and sit on the top of the outside of the pot;
(b) awkward entrance;
(c) restrictive gate;
(d) non adaptable size, weight and materials;
(e) cannot accommodate both commercial and individual crabbers;
(f) numerous moveable parts which can be difficult to maintain proper function, or protect from destructive outside interferences;
(g) complicated entrance doors;
(h) crab pots for individual use require frequent retrieval;
(i) there is often a loss of crabs from the tops or edges;
(j) traps that require nooses depend on securing individual crabs by the claw as they reach for bait;
(k) limited in the direction from which crabs may enter;
(l) a means of offering bait that can easily be attained and rapidly consumed.

SUMMARY OF THE INVENTION

The present invention provides a spring door crustacean trap. According to an aspect of the invention, the trap comprises a frame and a spring door. The frame has a top member with an outer periphery, a bottom member with an outer periphery, and at least one support post. The post is at least substantially perpendicular to the top and bottom members and separates and interconnects the members. The spring door extends from the outer periphery of at least one of the members laterally inwardly and toward the other of the members. The door includes a plurality of rods that extend toward and define a gap extending around the trap substantially parallel to the members. The gap is of a width, and the rods have sufficient spring tension, to allow entry of crustaceans into the trap through the gap, but to deter exit of crustaceans larger than a minimum size from the trap through the gap.

The trap may be provided with a number of preferred features. A first such feature is a gap that extends at least substantially all the way around the trap. Another feature is a plurality of support posts interconnecting the outer peripheries of the members. Still another feature is configuring the members and the door to deter crustaceans from climbing up onto or hanging on the trap.

In the preferred embodiments, the rods extend from the outer periphery of said at least one of the members laterally inwardly toward the gap. The door includes a plurality of spring wires extending around the door, and flexible line material joining the wires to the rods to provide the door with spring tension. Preferably, said at least one of the members has a plurality of circumferentially spaced grooves formed thereon. Each rod has a partial circle at one end. The partial circle snaps into one of the grooves to attach the end to the member.

In a first preferred embodiment of the invention, the door includes a top portion and a bottom portion. These portions extend from the outer periphery of the top member and the bottom member, respectively. The gap is located between the top and bottom portions at a midpoint between the members. Preferably, the top and bottom portions include the arrangement of spring wires and flexible line material described above. Also preferably, the feature of grooves and partial circles is further included.

In a second preferred embodiment, the door extends from the outer periphery of only one of the members. The gap is formed between the door and a portion of the trap surrounded by, but laterally inwardly offset from, the other of the members.

In accordance with the present invention, a crab pot is provided that is round and has a flat top and bottom that are interchangeable and an entrance that occupies the entire height and circumference. The spring door crab pot thus allows crabs to enter from all directions, but strongly discourages an exit. This new, innovative design may be of variable size and weight to accommodate both the commercial and the individual crab harvester.

An advantage of the present invention is an innovative design boasting of many features and objectives as follows:

(a) to provide a crab pot that can be made of variable weight and size to accommodate both the commercial and the individual crabber;
(b) to provide an entrance that occupies the entire circumference of the crab pot;
(c) to eliminate the need for walls that enable crabs to access the top of the pot, and thus remain on the outside, or fall off;

(d) to provide a choice of two methods of entry:
   (1) entry at ground level while preventing an exit;
   (2) entry through a gentle natural incline while preventing an exit;
(e) to provide a crab pot with an interchangeable top and bottom;
(f) to provide the utmost of performance without complicated, moveable parts;
(g) to provide the individual crabber with a lightweight pot that employs the advantages of a commercial pot, and does not require pulling up at frequent intervals;
(h) to provide a bait container wherein the bait cannot be easily consumed; and
(i) to provide an easy access door for removal of crabs once the pot is retrieved.

My crab pot has an eye appeal, as well as a superior function, and is versatile for all practical purposes. It is easy to comprehend its function, and understand why it is an excellent form of the art when observing how crabs move. My crab pot can produce a high yield for the commercial crabber, and a time efficient superior alternative to the prior art, for the individual crabber.

BRIEF DESCRIPTION OF THE DRAWINGS

FIG. 1A shows the Spring Door Crab Pot featuring the interchangeable variation wherein the crabs may enter at either the ground level, or crawl up a gentle incline and drop into the center of the pot.

FIG. 3 shows one of the spring steel rods shown in FIGS. 1 and 2 and the partial circle at one end as well as the V-shaped notches.

FIG. 4 is like FIG. 3 with the addition of a short extension for gripping at the end with the partial circle.

FIG. 5 shows the procedure of forming the knot to connect the spring steel rods and wire together through the use of a fishing line material.

FIGS. 2A–4A are like FIGS. 2–4, respectively, but show the second embodiment of FIG. 1A.

BEST MODES FOR CARRYING OUT THE INVENTION

Figure 1:
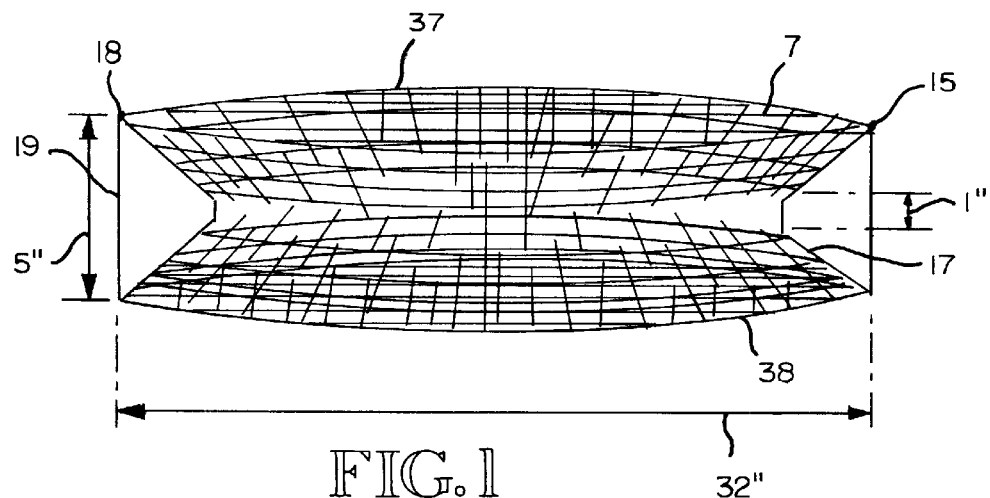
FIG. 1 shows the Spring Door Crab Pot featuring the variation wherein the crabs enter through a gentle incline to the mid point of the height of the pot, and drop into the center.

A typical embodiment of the spring door crab pot invention is illustrated in FIG. 1 (side view). The spring door of the illustrated crab pot is one of two design variations. The frame of FIG. 1 remains the same, consisting of a round top member 18 and a round bottom member 38 held parallel by four support posts 19. The posts 19 are perpendicular to the top and bottom members 18, 38 of the frame 11 and parallel to one another. The top and bottom of the frame are comprised of nets 17 made from a choice of wire materials, such as stainless steel, copper, brass, zinc or other such metals of a non-corrosive, anti-rust nature.

The spring door 15 occupying the height and the circumference of the crab pot is comprised of a series of elongated members made up of spring steel rods 36, extending from the frame top member 18 and bottom member 38 and connected to one another by spring steel wire 33 and a thin plastic medium 34, that can be fishing line. The spring door illustrated in FIG. 1 is the variation in which crabs enter through the upward and inward angle of the door, to the mid height of the pot, and drop into the center.

FIG. 1A illustrates the interchangeable variation of the spring door 42 wherein the crab may enter at either ground level, or crawl up a gentle incline and drop into the center of the pot.

Figure 2:
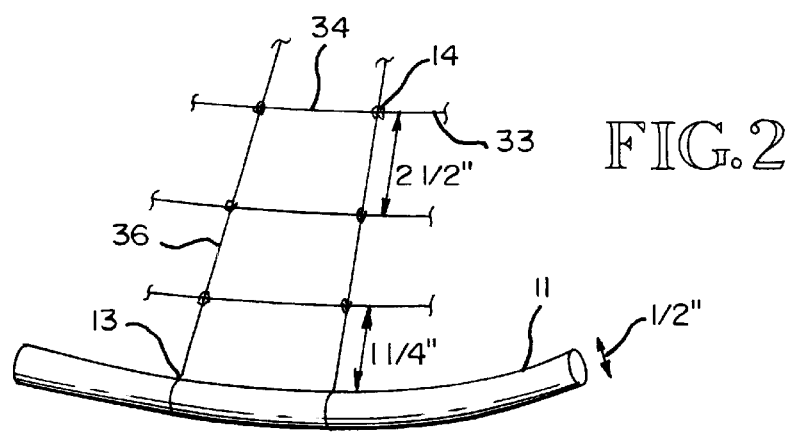
FIG. 2 shows a section of the circle of the frame shown in FIG. 1, with the spring steel rods attached and connected to each other with the use of spring steel wire and a fishing line plastic material.
Figure 2A:
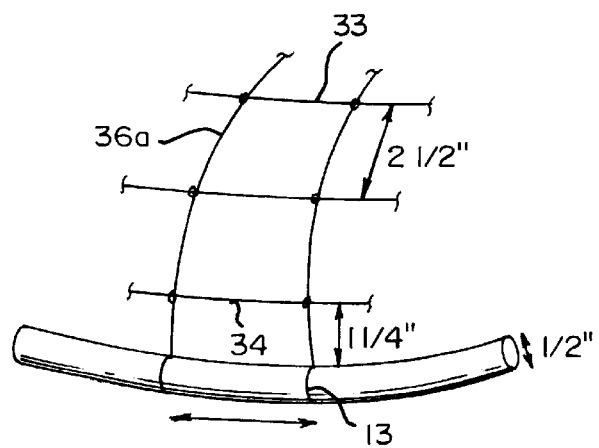

FIG. 2 illustrates a section of the frame 11 to demonstrate how the elongated spring steel members 36 are connected to the frame 11. First, as shown in FIG. 4 a partial circle 22 must be formed at one end of the stainless steel rod, with a temporary extension at the end of the encircled section 22. Second, a V-shaped notch 27 must be placed at intervals where the rods will be connected to one another by means of spring steel wire, and a thin plastic material, or fishing line 34.

A groove 13 can be drilled with a lathe machine to a variable size around the circumference of the frame, at three inch intervals. The groove depth and width will be a variable to accommodate a spring steel rod 36 of variable size. Thus the spring steel rod 36 will fit into the groove 13 with enough movement vertically so as to adjust to attain a desired angle at which it protrudes from the frame, to form the slant of the entrance. However, the width of the groove 13 must restrict the spring steel rod from any lateral movement. One end of each rod must form a partial circle 22 of variable size to fit into the groove 13. The end of the encircled rod may have a temporary extension 22' to assist in the snapping of the spring steel rod 36 into place in the groove 13. A grease may be applied to the groove to assist in the insertion of the rod. The extension 22' will be cut off once the rod is in the groove 13.

The elongated members 36 are then connected by spring steel wire 33 and a fishing line material 34 wherein they are joined (at 14 in FIG. 2) by means of a knot formed out of the fishing line as illustrated in FIG. 5. As the spring steel rods 36 are bound by the wire 33 and plastic material 34, a tension is developed. With each consecutive application of wire and plastic line, the rods 36 form a gentle incline towards the center of the pot. As this process is continued around the entire circumference of the pot, the perfect tension of the spring door 15 is completed. To form an escape, a wire may be chosen and clipped from the entrance door to form an opening with a height of 2¼ inches and a width of 5 inches.

There are two variations of the spring door crab pot. In both variations the top and bottom are interchangeable, thus allowing the crab pot to be productive no matter how the pot lands in the water. In the variation illustrated in FIG. 1, there is a series of spring steel rods 36 extending from both the top and the bottom circles 18, 38 of the frame. To accomplish this result, the grooves 13 are placed at three inch intervals on each of the frame circles 18, 38. When the frame circles are joined by the posts to be parallel to one another, the grooves 13 must not be parallel, but alternate in relation to the one above or below the other. Thus, when the rods 36 are in place, the entrance is formed by rods 36 extending from both the top and bottom circles of the frame. Crabs will then enter the pot at a midpoint of the height of the crab pot, through a one-inch gap in the spring door.

The second variation of FIG. 1A requires grooves 13 on only one circle of the frame. The spring door 42 of this crab pot will be formed by a series of rods 36A that have been given a slight curve and will extend from only one circle of the frame. This style is interchangeable, wherein crabs may enter at either ground level, or by a gentle incline towards the center of the pot. A one-inch space is needed for entry through the spring door.

An example of the dimensions used to create a spring door crab pot for an individual's use, such as from a small boat or off of a dock, are as follows:

To create a spring door crab pot as shown in FIG. 1, with a 32 inch diameter as an example, will require two aluminum rods each having a ten 10 foot length and a diameter of ½ inch. Each aluminum rod will be cut to a length of 8 feet so as to be placed in a lathe wherein it will have grooves drilled. Specification for the grooves are a 0.070 inch depth, and a 0.073 inch width. Grooves 13 will be placed at three inch intervals, consecutively, one after the other. The grooves 13 will begin 1½ inches from the end of the aluminum rod and will come to be a total of thirty-four. The aluminum rods with the grooves will each be rolled and welded to form a circle with a 32 inch diameter. Once the aluminum rods have been rolled and welded, there will be thirty-three grooves remaining on each of the two circles making up the top and the bottom of the frame. Four posts 19 will be cut to five inch lengths, from the remaining lengths of the aluminum rods. The four posts 19 will now be welded at equal intervals to become perpendicular to the circles of the frame and parallel to one another, while maintaining an alternating of grooves 13 as they relate to one another, from one circle of the frame to the other. Therefore, each groove 13 will be offset by 1½ inches from the grooves 13 above or below it.

Spring steel wire of $\frac{1}{16}$ inch diameter must be cut to form the sixty-six rods 36 necessary to form the spring door 15 of this variation of the crab pot, as shown in FIG. 1. One end of each rod must have a partial circle 22 formed to a measurement of a $\frac{5}{16}$ inch diameter, with a small length of an extension 22', shown in FIG. 4, which may be only ½ inch. Three V-shaped notches 27 must be formed. The first one will be placed 1¼ inches from the encircled end, and the second will be 2¼ inches above the first, and the third notch will be 2½ inches about the second, with one inch remaining. The rods 36 may now be snapped into their respective grooves 13. Grease may be applied to the inside of the partial circle 22 for easy insertion. The extension 22' of the partial circle 22 at the end of the rod will provide a place to grip while snapping the rod into place in the groove 13. Once the rod is in place, the extension will be cut off and discarded. Once all of the spring steel rods have been consecutively snapped into their respective grooves 13, the spring steel wire and fishing line material must be added to produce the tension for the spring door 15. The rods for the door 15 are connected by spring steel wire 33 and a fishing line material 34 wherein they are joined by means of a knot formed out of the fishing line as illustrated in FIG. 5. As the rods are bound by the wire 33 and plastic fishing line material 34, the rods form a slant towards the center of the pot. This spring door 15 will provide an entrance wherein the crabs crawl up a gentle incline and drop at the midpoint of the entrance into the center of the pot. This variation of the spring door crab pot has an interchangeable top and bottom.

An escape door 43 (FIG. 1A) will be created by cutting a section of wire to an opening with a height of 2¼ inches and a width of 4½ inches. A wire net 7 must now be attached to both the top member 18 and the bottom member 38 of the aluminum frame. To form the door 37 for removal of crabs, attach only one half of the wire net to one or the other of the top or bottom frame member. Attach the remaining one half of the net to a wire to form the door. A closure must be attached to secure the wire net to the remaining one half of the frame. A wire net bait container of variable size may be added.

Operation—FIGS. 1 and 1A

The manner of using the spring door crab pots of FIGS. 1 and 1A will be determined according to the commercial and individual crab harvester. The spring door crab pot will vary in size and weight to accommodate both the commercial and individual crabber. FIGS. 1 and 1A will require construction according to specifications necessary to meet the demands of the commercial crab harvester. The function of the spring door 15 (FIG. 1) and 42 (FIG. 1A) will remain the same for both uses, commercial and individual.

Commercial crabbing requires the crab pot to be secured to buoys and dropped from a fishing vessel to the floor of the ocean or bay. The manner in which this is done will remain the same as it is for other commercial crab pots. The difference will be the superior function of the spring door entrance. The manner in which the individual will employ this crab pot will be by ropes that are secured to each of the support posts 19 and joined to one rope by which the crab pot will be raised and lowered from a dock. If the individual is crabbing from a vessel, then he too is required to secure his crab pot to a marked buoy. The advantage the individual experiences is an interchangeable, superior functioning crab pot, with a spring door entrance which eliminates the need for frequent retrieval.

The spring door design is the key to the superior function of this crab pot. FIGS. 2, 4, and 5 illustrate how this door is comprised to create the spring like tension required to allow crabs to enter in an easy and appealing manner, but not allow them to escape or climb to sit on the top of the pot or the edges thereof. This results in an increased yield.

Advantages

Accordingly the reader will see that the spring door crab pot invention is a superior design with the most desirable results. There are two variations to this crab pot, and both variations are interchangeable. This adds to the merit, so as to achieve the most superior results while allowing for a variety of choices to be employed by the crabber. The spring door is an innovative invention that has never before been seen on any other crab pot in any likeness of its appearance or function.

Furthermore, the spring door crab pot has the additional advantages in that the entrance occupies the entire circumference and height of the crab pot;

it does not permit crabs to crawl to sit upon the top of the pot or the edges where the crabs can fall off upon retrieval of the pot;

it allows the crabs to enter in a natural manner of how the crabs move;

the entrance, while providing the perfect tension for crabs to enter, maintains its shape and springs back once crabs have dropped into the center of the pot;

it provides the individual crabber with freedom from the need to frequently pull the pot up for retrieval of crabs;

it provides a superior entrance, whereby crabs may not escape, without the use of moveable parts and intricate trigger mechanisms;

it provides a frame that is durable not only for the commercial crabber, but also for the individual;

it provides two variations of the spring door;

both variations are interchangeable thus allowing three methods of entrapping crabs;

it provides a door for very easy removal of crabs;

it allows for the bait to be seen, if desired;

it allows for the bait container to be made of a small wire net so as to make the bait difficult to be consumed;

it provides the individual crabber with a durable pot that can be easily repaired and have parts replaced for many years of use.

Although the description above contains many specifications, these should not be constructed as limiting the scope of the invention, but as merely providing illustrations of some of the present preferred embodiments of this invention. A feature of the spring door crab pot is that there can be variables so as to allow for greater freedom of choice and variety while still employing the distinct advantages of the spring door design as well as the full circumference entrance.

Thus the scope of the invention should be determined by the appended claims and their legal equivalents, rather than by the examples given.

I claim:

1. A spring door crustacean trap comprising:

a frame having a top member with an outer periphery, a bottom member with an outer periphery, and at least one support post at least substantially perpendicular to said members and separating and interconnecting said members; and a spring door extending from said outer periphery of at least one of said members laterally inwardly and toward the other of said members; said door including a plurality of rods that extend toward and define a gap extending around the trap substantially parallel to said members, and at least one tensioning member extending around said door and connected to and producing a spring tension in said rods; said spring tension being developed in said rods during assembly of said door by connection of said tensioning member to said rods; and said gap being of a width, and said rods having sufficient spring tension, to allow entry of crustaceans into the trap through said gap, but to deter exit of crustaceans larger than a minimum size from the trap through said gap.

2. The trap of claim 1, wherein said gap extends at least substantially all the way around the trap.

3. The trap of claim 1, which comprises a plurality of support posts interconnecting said outer peripheries of said members.

4. The trap of claim 1, wherein said members and said door are configured to deter crustaceans from climbing up onto or hanging on the trap.

5. A spring door crustacean trap comprising:

a frame having a top member with an outer periphery, a bottom member with an outer periphery, and at least one support post at least substantially perpendicular to said members and separating and interconnecting said members; and a spring door extending from said outer periphery of at least one of said members laterally inwardly and toward the other of said members; said door including a plurality of rods that extend toward and define a gap extending around the trap substantially parallel to said members; and said gap being of a width, and said rods having sufficient spring tension, to allow entry of crustaceans into the trap through said gap, but to deter exit of crustaceans larger than a minimum size from the trap through said gap;

wherein said rods extend from said outer periphery of said at least one of said members laterally inwardly toward said gap; and said door includes a plurality of spring wires extending around said door, and flexible line material joining said wires to said rods to provide said door with spring tension.

6. The trap of claim 5, wherein said at least one of said members has a plurality of circumferentially spaced grooves formed thereon, and each said rod has a partial circle at one end that snaps into one of said grooves to attach said one end to said at least one of said members.

7. The trap of claim 1, wherein said door includes a top portion and a bottom portion extending from said outer periphery of said top member and said bottom member, respectively, and said gap is located between said top and bottom portions at a midpoint between said members.

8. A spring door crustacean trap comprising:

a frame having a top member with an outer periphery, a bottom member with an outer periphery, and at least one support post at least substantially perpendicular to said members and separating and interconnecting said members; and a spring door extending from said outer periphery of at least one of said members laterally inwardly and toward the other of said members; said door including a plurality of rods that extend toward and define a gap extending around the trap substantially parallel to said members; and said gap being of a width, and said rods having sufficient spring tension, to allow entry of crustaceans into the trap through said gap, but to deter exit of crustaceans larger than a minimum size from the trap through said gap;

wherein said door includes a top portion and a bottom portion extending from said outer periphery of said top member and said bottom member, respectively, and said gap is located between said top and bottom portions at a midpoint between said members; and wherein said top and bottom portions include rods extending from said outer periphery of said top and bottom members, respectively, toward said gap; and each of said top and bottom portions includes a plurality of spring wires extending around said door, and flexible line material joining said wires to said rods to provide said door with spring tension.

9. The trap of claim 8, wherein each of said members has a plurality of circumferentially spaced grooves formed thereon, and each said rod has a partial circle at one end that snaps into one of said grooves to attach said one end to the corresponding member.

10. The trap of claim 1, wherein said door extends from said outer periphery of only one of said members, and said gap is formed between said door and a portion of the trap surrounded by, but laterally inwardly offset from, the other of said members.

11. A spring door crustacean trap comprising:

a frame having a top member with an outer periphery, a bottom member with an outer periphery, and at least one support post at least substantially perpendicular to said members and separating and interconnecting said members; and a spring door extending from said outer periphery of at least one of said members laterally inwardly and toward the other of said members; said door including a plurality of rods that extend toward and define a gap extending around the trap substantially parallel to said members; and said gap being of a width, and said rods having sufficient spring tension, to allow entry of crustaceans into the trap through said gap, but to deter exit of crustaceans larger than a minimum size from the trap through said gap;

wherein said door extends from said outer periphery of only one of said members, and said gap is formed between said door and a portion of the trap surrounded by, but laterally inwardly offset from, the other of said members; and wherein said rods extend from said outer periphery of said one of said members laterally inwardly toward said gap; and said door includes a plurality of spring wires extending around said door, and flexible line material joining said wires to said rods to provide said door with spring tension.

12. The trap of claim 11, wherein said one of said members has a plurality of circumferentially spaced grooves formed thereon, and each said rod has a partial circle at one end that snaps into one of said grooves to attach said one end to said one of said members.

* * * * *